(12) United States Patent
Shi et al.

(10) Patent No.: US 11,064,492 B2
(45) Date of Patent: Jul. 13, 2021

(54) RESOURCE CONFIGURATION METHOD AND APPARATUS

(71) Applicant: HUAWEI TECHNOLOGIES CO., LTD., Guangdong (CN)

(72) Inventors: Hongzhe Shi, Shanghai (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/399,771

(22) Filed: Apr. 30, 2019

(65) Prior Publication Data

US 2019/0261345 A1 Aug. 22, 2019

Related U.S. Application Data

(63) Continuation of application No. PCT/CN2018/079911, filed on Mar. 21, 2018.

(30) Foreign Application Priority Data

Mar. 23, 2017 (CN) .......................... 201710177805.7
Jun. 15, 2017 (CN) .......................... 201710452685.7
Sep. 1, 2017 (CN) .......................... 201710788369.7

(51) Int. Cl.
*H04W 72/04* (2009.01)
*H04L 1/00* (2006.01)
(Continued)

(52) U.S. Cl.
CPC ......... *H04W 72/046* (2013.01); *H04L 1/0026* (2013.01); *H04L 5/0051* (2013.01); *H04W 8/24* (2013.01); *H04W 24/10* (2013.01)

(58) Field of Classification Search
None
See application file for complete search history.

(56) References Cited

U.S. PATENT DOCUMENTS 10,333,602 B2 * 6/2019 Yoo ...................... H04B 7/0619
2004/0157646 A1 * 8/2004 Raleigh ............... H01Q 3/2605
455/562.1
(Continued)

FOREIGN PATENT DOCUMENTS

CN 103138812 A 6/2013
CN 104956606 A 9/2015
(Continued)

OTHER PUBLICATIONS

R1-1710449—Huawei, HiSilicon, "General views on DL beam management," 3GPP TSG RAN WG1 NR Ad Hoc Meeting, Qingdao, China, Jun. 27-30, 2017, 11 pages.
(Continued)

*Primary Examiner* — Kenny S Lin
*Assistant Examiner* — Richard Schnell
(74) *Attorney, Agent, or Firm* — Fish & Richardson P.C.

(57) ABSTRACT

The present disclosure relates to resource configuration methods and apparatus. A user equipment (UE) generates receiving beam quantity indication information indicating a maximum quantity of receiving beams that is supported by the UE, and sends the receiving beam quantity indication information to a network device. The maximum quantity of receiving beams is used for a configuration of a beam management reference signal resource for the UE. The UE receives the configuration of a beam management reference signal resource for the UE from the network device.

16 Claims, 8 Drawing Sheets

(51) Int. Cl.
*H04L 5/00* (2006.01)
*H04W 8/24* (2009.01)
*H04W 24/10* (2009.01)

(56) References Cited

U.S. PATENT DOCUMENTS

| | | |
|---|---|---|
| 2010/0272077 A1 | 10/2010 | Van Rensburg et al. |
| 2012/0213300 A1 | 8/2012 | Yamaura |
| 2013/0272220 A1 | 10/2013 | Li et al. |
| 2013/0301454 A1 | 11/2013 | Seol et al. |
| 2014/0241242 A1 | 8/2014 | Josiam et al. |
| 2015/0341105 A1 | 11/2015 | Yu et al. |
| 2016/0182163 A1 | 6/2016 | Guey et al. |
| 2016/0197659 A1 | 7/2016 | Yu et al. |
| 2016/0337916 A1* | 11/2016 | Deenoo .................. H04W 8/22 |
| 2017/0245260 A1* | 8/2017 | Islam .................... H04L 5/0057 |
| 2017/0359734 A1 | 12/2017 | Lee et al. |
| 2018/0069613 A1* | 3/2018 | Li ............................ H04B 7/06 |
| 2018/0131426 A1 | 5/2018 | Lee et al. |
| 2018/0212651 A1* | 7/2018 | Li ........................ H04B 7/0417 |
| 2019/0081688 A1* | 3/2019 | Deenoo ................ H04B 7/0695 |
| 2019/0109687 A1* | 4/2019 | Takeda .................. H04L 5/0048 |
| 2019/0245595 A1* | 8/2019 | Xu ........................ H04W 24/08 |
| 2020/0100129 A1* | 3/2020 | Sun ..................... H04W 72/046 |

FOREIGN PATENT DOCUMENTS

| | | | |
|---|---|---|---|
| CN | 105103261 A | 11/2015 | |
| CN | 105308880 A | 2/2016 | |
| CN | 105453629 A | 3/2016 | |
| CN | 106160821 A | 11/2016 | |
| CN | 106416090 A | 2/2017 | |
| CN | 107889222 A | 4/2018 | |
| CN | 109891774 A | 6/2019 | |
| WO | 2013109059 A1 | 7/2013 | |
| WO | 2016165128 A1 | 10/2016 | |

OTHER PUBLICATIONS

R1-1702798—NTT Docomo, Inc., "Views on beam management framework," 3GPP TSG RAN WG1 Meeting #88, Athens, Greece, Feb. 13-17, 2017, 5 pages.
PCT International Search Report and Written Opinion issued in International Application No. PCT/CN2018/079911 dated Jun. 14, 2018, 11 pages (partial English translation).
Office Action issued in Chinese Application No. 201910258654.7 dated Oct. 10, 2019, 6 pages.
Search Report issued in Chinese Application No. 201910258654.7 dated Sep. 29, 2019. 2 pages.
Extended European Search Report issued in European Application No. 18771942.2 dated Dec. 10, 2019, 9 pages.
Huawei, HiSilicon, "CSI-RS design for beam management," 3GPP TSG RAN NR Ad-Hoc Meeting, R1-1700069; Spokane, USA, Jan. 16-20, 2017, 7 pages.
Office Action issued in Chinese Application No. 201710788369.7 dated Mar. 16, 2020, 9 pages.
ASUSTeK, "Considerations on UE Beamforming Management," 3GPP TSG RAN WG1 Meeting #88, R1-1703051, Athens, Greece, Feb. 13-17, 2017, 3 pages.
Nokia, Alcatel-Lucent Shanghai Bell, "Beam Measurements and TX/RX Beam Correspondence," 3GPP TSG RAN WG1#88, R1-1703161, Athens, Greece, Feb. 13-17, 2017, 3 pages.
Office Action issued in Japanese Application No. 2019-534916 dated Sep. 14, 2020, 7 pages (with English translation).
Office Action issued in Indian Application No. 201937020795 dated Nov. 24, 2020, 6 pages.

* cited by examiner

RESOURCE CONFIGURATION METHOD AND APPARATUS

CROSS-REFERENCE TO RELATED APPLICATIONS

This application is a continuation of International Application No. PCT/CN2018/079911, filed on Mar. 21, 2018, and claims priority to Chinese Patent Application No. 201710177805.7, filed on Mar. 23, 2017, Chinese Patent Application No. 201710452685.7, filed on Jun. 15, 2017, and Chinese Patent Application No. 201710788369.7, filed on Sep. 1, 2017, The disclosures of the aforementioned applications are hereby incorporated by reference in their entireties.

TECHNICAL FIELD

The present disclosure relates to the communications field, and in particular, to a resource configuration method and an apparatus.

BACKGROUND

Beamforming is a signal preprocessing technology that is based on an antenna array. In beamforming, a directional beam is generated after a weighting coefficient of each array element in the antenna array is adjusted, so that an obvious array gain can be obtained. In New Radio (NR), to resist a path loss in a high-frequency scenario, beamforming is more frequently used for an antenna array to obtain a gain. A data channel, a control channel, a synchronization signal, and a broadcast signal all can be sent by using a beam. Therefore, beam management (BM) seems relatively important in NR.

FIG. 1 is a schematic diagram of downlink beam management phases in existing NR. As shown in FIG. 1, beam management is mainly divided into three phases: P-1, P-2, and P-3. The P-1 phase is a phase in which a system sets up an initial beam pair link (BPL), that is, sets up a BPL between a transmitting beam of a base station and a receiving beam of user equipment (UE). After the P-1 phase, an initial beam-based control information and data communication link between the base station and the UE is set up. The P-2 phase and the P-3 phase are phases of respectively further selecting a transmitting beam of the base station and a receiving beam of the UE based on triggering.

In a downlink beam pairing process, the base station configures a channel state information-reference signal (CSI-RS) resource, and the UE measures and estimates beam quality based on a CSI-RS. To obtain a best beam pair, all transmitting beams of the base station and all receiving beams of the UE need to be polled. If beam scanning of the transmitting beams of the base station is periodic, regardless of a quantity of receiving beams of the UE, the transmitting beams of the base station can be measured one by one in a polling manner based on a predetermined period for reporting. In other words, in this scenario, the base station does not need to know the quantity of receiving beams of the UE because resource configuration performed by the base station is periodic. However, if scanning of the transmitting beams of the base station is nonperiodic, when an available receiving beam of the UE is unknown, CSI-RS resource configuration performed by the base station is blind to a specific extent.

Currently, when the base station does not know the available receiving beam of the UE, the base station may perform beam scanning in a polling manner through frequent triggering, but this causes extra signaling and reporting overheads; or the base station performs configuration according to a maximum quantity of receiving beams that is stipulated in a protocol, but this may cause a waste of radio resources.

SUMMARY

Embodiments of the present invention aim to provide a resource configuration method and an apparatus, to pertinently configure a beam management reference signal resource. This can reduce signaling and reporting overheads or save radio resources.

According to a first aspect, an embodiment of the present invention provides a resource configuration method, including: determining, by user equipment, a quantity of available receiving beams of the user equipment, and sending receiving beam quantity indication information to a network device, where the receiving beam quantity indication information indicates the quantity of available receiving beams of the user equipment; and receiving, by the network device, the receiving beam quantity indication information sent by the user equipment, and configuring a beam management reference signal resource based on the quantity of available receiving beams of the user equipment and a quantity of transmitting beams of the network device. The user equipment reports the quantity of available receiving beams of the user equipment to the network device, so that the network device can accurately know the quantity of receiving beams of the user equipment, to perform configuration. This can reduce signaling and reporting overheads or save radio resources.

In a possible implementation, the user equipment sends the receiving beam quantity indication information to the network device by using uplink control information. In other words, for the network device, the receiving beam quantity indication information is carried in the uplink control information. In this case, a system has set up an initial beam-based control information and data communication link.

In a possible implementation, the user equipment sends the receiving beam quantity indication information to the network device by using a physical random access channel PRACH message. In other words, for the network device, the receiving beam quantity indication information is carried in the PRACH message. In this case, a system has not set up an initial beam-based control information and data communication link.

In a possible implementation, the PRACH message is a radio resource control RRC connection request message or a random access preamble message that has an information load capability.

In a possible implementation, when receiving a user capability query request message sent by the network device, the user equipment sends the receiving beam quantity indication information to the network device by using a user capability query response message. In other words, for the network device, the receiving beam quantity indication information is carried in the user capability query response message.

In a possible implementation, the beam management reference signal is used by the user equipment to measure beam quality, and the beam management reference signal includes a channel state information-reference signal CSI-RS.

In a possible implementation, in an example in which the beam management reference signal is the CSI-RS, a process in which the network device configures the beam management reference signal resource based on the quantity of available receiving beams of the user equipment and the quantity of transmitting beams of the network device is as follows: The network device determines a quantity of required CSI-RS resources based on the quantity of available receiving beams of the user equipment and the quantity of transmitting beams of the network device; and configures a CSI-RS resource based on the quantity of CSI-RS resources. The network device may perform configuration at least once, and correspondingly perform beam scanning at least once.

In a possible implementation, an available receiving beam of the user equipment is associated with a transmitting beam of the user equipment.

In a possible implementation, the quantity of receiving beams of the user equipment is associated with a quantity of transmitting beams of the user equipment. In other words, there is a specific association relationship between the quantity of receiving beams and the quantity of transmitting beams. The quantity of receiving beams may be equal to the quantity of transmitting beams. Alternatively, the quantity of transmitting beams may be determined based on the quantity of receiving beams, or the quantity of receiving beams may be determined based on the quantity of transmitting beams.

According to a second aspect, an embodiment of the present invention provides a reporting configuration method, including: determining, by user equipment, a quantity of available receiving beams of the user equipment, and sending receiving beam quantity indication information to a network device, where the receiving beam quantity indication information indicates the quantity of available receiving beams of the user equipment; and receiving, by the network device, the receiving beam quantity indication information sent by the user equipment, and configuring a beam measurement reporting parameter based on the quantity of available receiving beams of the user equipment and a quantity of transmitting beams of the network device. The beam measurement reporting parameter may include a reporting period, and the network device configures the reporting period based on the quantity of receiving beams of the user equipment and the quantity of transmitting beams of the network device. This can reduce a quantity of reporting times of the user equipment, and can properly use an uplink resource.

In a possible implementation, an available receiving beam of the user equipment is associated with a transmitting beam of the user equipment.

In a possible implementation, the quantity of available receiving beams of the user equipment is associated with a quantity of transmitting beams of the user equipment. In other words, there is a specific association relationship between the quantity of receiving beams and the quantity of transmitting beams. The quantity of receiving beams may be equal to the quantity of transmitting beams. Alternatively, the quantity of transmitting beams may be determined based on the quantity of receiving beams, or the quantity of receiving beams may be determined based on the quantity of transmitting beams.

According to a third aspect, an embodiment of the present invention provides user equipment, and the user equipment has a function of implementing behavior of the user equipment in the method in the first aspect or the second aspect. The function may be implemented by hardware, or may be implemented by hardware by executing corresponding software. The hardware or the software includes one or more modules corresponding to the function.

In a possible implementation, the user equipment includes a determining unit and a sending unit, where the determining unit is configured to determine a quantity of available receiving beams of the user equipment; and the sending unit is configured to send receiving beam quantity indication information to a network device, where the receiving beam quantity indication information indicates the quantity of available receiving beams of the user equipment, and the receiving beam quantity indication information is used by the network device to configure a beam management reference signal resource based on the quantity of available receiving beams of the user equipment and a quantity of transmitting beams of the network device.

In another possible implementation, the user equipment includes a processor and a transceiver, where the processor is configured to determine a quantity of available receiving beams of the user equipment; and the transceiver is configured to send receiving beam quantity indication information to a network device, where the receiving beam quantity indication information indicates the quantity of available receiving beams of the user equipment, and the receiving beam quantity indication information is used by the network device to configure a beam management reference signal resource based on the quantity of available receiving beams of the user equipment and a quantity of transmitting beams of the network device.

Based on a same inventive concept, for a problem-resolving principle and beneficial effects of the user equipment, refer to the method in the first aspect or the second aspect and beneficial effects brought by the method. For implementation of the user equipment, refer to implementation of the method in the first aspect or the second aspect. No repeated description is provided.

According to a fourth aspect, an embodiment of the present invention provides a network device, and the network device has a function of implementing behavior of the network device in the method in the first aspect. The function may be implemented by hardware, or may be implemented by hardware by executing corresponding software. The hardware or the software includes one or more modules corresponding to the function.

In a possible implementation, the network device includes a receiving unit and a configuration unit, where the receiving unit is configured to receive receiving beam quantity indication information sent by user equipment, where the receiving beam quantity indication information indicates a quantity of available receiving beams of the user equipment; and the configuration unit is configured to configure a beam management reference signal resource based on the quantity of available receiving beams of the user equipment and a quantity of transmitting beams of the network device.

In another possible implementation, the network device includes a processor and a transceiver, where the transceiver is configured to receive receiving beam quantity indication information sent by user equipment, where the receiving beam quantity indication information indicates a quantity of available receiving beams of the user equipment; and the processor is configured to configure a beam management reference signal resource based on the quantity of available receiving beams of the user equipment and a quantity of transmitting beams of the network device.

Based on a same inventive concept, for a problem-resolving principle and beneficial effects of the network device, refer to the method in the first aspect and beneficial effects brought by the method. For implementation of the network device, refer to implementation of the method in the first aspect. No repeated description is provided.

The network device further has a function of implementing behavior of the network device in the method in the second aspect. The function may be implemented by hardware, or may be implemented by hardware by executing corresponding software. The hardware or the software includes one or more modules corresponding to the function.

In a possible implementation, the network device includes a receiving unit and a configuration unit, where the receiving unit is configured to receive receiving beam quantity indication information sent by user equipment, where the receiving beam quantity indication information indicates a quantity of available receiving beams of the user equipment; and the configuration unit is configured to configure a beam measurement reporting parameter based on the quantity of available receiving beams of the user equipment and a quantity of transmitting beams of the network device.

In another possible implementation, the network device includes a processor and a transceiver, where the transceiver is configured to receive receiving beam quantity indication information sent by user equipment, where the receiving beam quantity indication information indicates a quantity of available receiving beams of the user equipment; and the processor is configured to configure a beam measurement reporting parameter based on the quantity of available receiving beams of the user equipment and a quantity of transmitting beams of the network device.

Based on a same inventive concept, for a problem-resolving principle and beneficial effects of the network device, refer to the method in the second aspect and beneficial effects brought by the method. For implementation of the network device, refer to implementation of the method in the second aspect. No repeated description is provided.

According to a fifth aspect, an embodiment of the present invention provides a resource configuration method, including: sending, by a network device, receiving beam quantity indication information to user equipment, where the receiving beam quantity indication information indicates a maximum quantity, specified by the network device, of allowed receiving beams that can be used by the user equipment for beam scanning, and configuring a beam management reference signal resource based on the maximum quantity of allowed receiving beams and a quantity of transmitting beams of the network device; and receiving, by the user equipment, the receiving beam quantity indication information sent by the network device, and selecting a receiving beam based on the maximum quantity of allowed receiving beams. The network device delivers, to the user equipment, the constrained maximum quantity of allowed receiving beams that can be used by the user equipment for beam scanning and pairing. This can reduce signaling and reporting overheads or save radio resources.

In a possible implementation, the network device sends the receiving beam quantity indication information to the user equipment by using RRC signaling. In other words, for the user equipment, the receiving beam quantity indication information is carried in the RRC signaling. Alternatively, the network device may send the receiving beam quantity indication information to the user equipment by using other layer 3 signaling.

In a possible implementation, the network device sends the receiving beam quantity indication information to the user equipment by using Media Access Control signaling. In other words, for the user equipment, the receiving beam quantity indication information is carried in the Media Access Control signaling. Alternatively, the network device may send the receiving beam quantity indication information to the user equipment by using other layer 2 signaling.

In a possible implementation, the network device sends the receiving beam quantity indication information to the user equipment by using downlink control information. In other words, for the user equipment, the receiving beam quantity indication information is carried in the downlink control information. Alternatively, the network device may send the receiving beam quantity indication information to the user equipment by using other layer 1 signaling.

In a possible implementation, the beam management reference signal is used by the user equipment to measure beam quality, and the beam management reference signal includes a channel state information-reference signal CSI-RS.

In a possible implementation, in an example in which the beam management reference signal is the CSI-RS, a process in which the network device configures the beam management reference signal resource based on the maximum quantity of allowed receiving beams and the quantity of transmitting beams of the network device is as follows:

The network device determines a quantity of required CSI-RS resources based on the maximum quantity of allowed receiving beams and the quantity of transmitting beams of the network device; and configures a CSI-RS resource based on the quantity of CSI-RS resources.

Specifically, the network device configures the quantity of CSI-RS resources based on a quantity of available receiving beams that is reported by the user equipment.

In an implementation, the network device configures a quantity of CSI-RS resources in a corresponding CSI-RS resource set, where the CSI-RS resource set includes one or more CSI-RS resources.

In another implementation, the network device configures a quantity of measurement repetition times for a corresponding CSI-RS resource set.

The network device may perform configuration at least once, and correspondingly perform beam scanning at least once.

In a possible implementation, a process in which the user equipment selects the receiving beam based on the maximum quantity of allowed receiving beams is as follows: The user equipment obtains a quantity of available receiving beams of the user equipment; and if the quantity of available receiving beams of the user equipment is greater than the maximum quantity of allowed receiving beams, the user equipment selects, from the available receiving beams of the user equipment, receiving beams whose quantity is the same as the maximum quantity of allowed receiving beams; or if the quantity of available receiving beams of the user equipment is less than or equal to the maximum quantity of allowed receiving beams, the user equipment selects all the available receiving beams of the user equipment.

According to a sixth aspect, an embodiment of the present invention provides another user equipment, and the user equipment has a function of implementing behavior of the user equipment in the method in the fifth aspect. The function may be implemented by hardware, or may be implemented by hardware by executing corresponding software. The hardware or the software includes one or more modules corresponding to the function.

In a possible implementation, the user equipment includes a receiving unit and a selection unit, where the receiving unit is configured to receive receiving beam quantity indication information sent by a network device, where the receiving beam quantity indication information indicates a maximum quantity, specified by the network device, of allowed receiving beams that can be used by the user equipment for beam scanning and pairing; and the selection unit is configured to select a receiving beam based on the maximum quantity of allowed receiving beams.

In another possible implementation, the user equipment includes a processor and a transceiver, where the transceiver is configured to receive receiving beam quantity indication information sent by a network device, where the receiving beam quantity indication information indicates a maximum quantity, specified by the network device, of allowed receiving beams that can be used by the user equipment for beam scanning and pairing; and the processor is configured to select a receiving beam based on the maximum quantity of allowed receiving beams.

Based on a same inventive concept, for a problem-resolving principle and beneficial effects of the user equipment, refer to the method in the fifth aspect and beneficial effects brought by the method. For implementation of the user equipment, refer to implementation of the method in the fifth aspect. No repeated description is provided.

According to a seventh aspect, an embodiment of the present invention provides a network device, and the network device has a function of implementing behavior of the network device in the method in the fifth aspect. The function may be implemented by hardware, or may be implemented by hardware by executing corresponding software. The hardware or the software includes one or more modules corresponding to the function.

In a possible implementation, the network device includes a sending unit and a configuration unit, where the sending unit is configured to send receiving beam quantity indication information to user equipment, where the receiving beam quantity indication information indicates a maximum quantity, specified by the network device, of allowed receiving beams that can be used by the user equipment for beam scanning and pairing, and the receiving beam quantity indication information is used by the user equipment to select a receiving beam based on the maximum quantity of allowed receiving beams; and the configuration unit is configured to configure a beam management reference signal resource based on the maximum quantity of allowed receiving beams and a quantity of transmitting beams of the network device.

In another possible implementation, the network device includes a processor and a transceiver, where the transceiver is configured to send receiving beam quantity indication information to the user equipment, where the receiving beam quantity indication information indicates a maximum quantity, specified by the network device, of allowed receiving beams that can be used by the user equipment for beam scanning and pairing, and the receiving beam quantity indication information is used by the user equipment to select a receiving beam based on the maximum quantity of allowed receiving beams; and the processor is configured to configure a beam management reference signal resource based on the maximum quantity of allowed receiving beams and a quantity of transmitting beams of the network device.

Based on a same inventive concept, for a problem-resolving principle and beneficial effects of the network device, refer to the method in the fifth aspect and beneficial effects brought by the method. For implementation of the network device, refer to implementation of the method in the fifth aspect. No repeated description is provided.

According to an eighth aspect, an embodiment of the present invention provides a computer readable storage medium, including an instruction. When the instruction runs on a computer, the computer is enabled to perform the user-equipment-side method according to the first aspect, the second aspect, or the fifth aspect.

According to a ninth aspect, an embodiment of the present invention provides a computer readable storage medium, including an instruction. When the instruction runs on a computer, the computer is enabled to perform the network-device-side method according to the first aspect, the second aspect, or the fifth aspect.

In implementation of the embodiments of the present invention, the user equipment reports the quantity of available receiving beams to the network device, or the network device constrains and delivers the maximum quantity of allowed receiving beams of the user equipment, so that the network device pertinently configures a beam management reference signal resource. This can reduce signaling and reporting overheads or save radio resources.

BRIEF DESCRIPTION OF DRAWINGS

To describe the technical solutions in the embodiments of the present invention or in the background more clearly, the following describes the accompanying drawings required for describing the embodiments of the present invention or the background.

DESCRIPTION OF EMBODIMENTS

The following describes the embodiments of the present invention with reference to the accompanying drawings in the embodiments of the present invention.

Figure 2:
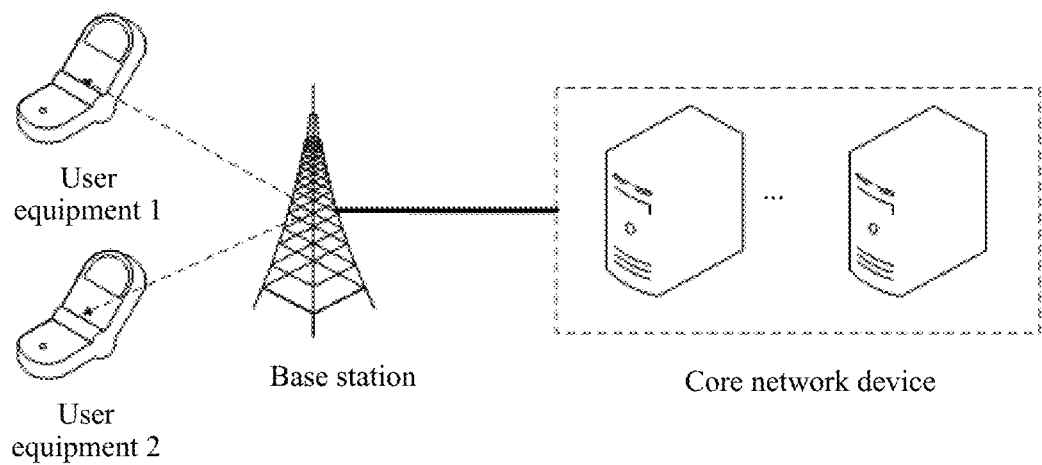
FIG. 2 is a schematic diagram of an application scenario of an embodiment of the present invention.

The embodiments of the present invention may be applied to a wireless communications system. The wireless communications system usually includes a cell. As shown in FIG. 2, each cell includes one base station (BS), the base station provides communications services for a plurality of user equipments, and the base station is connected to a core network device. The base station includes a baseband unit (BBU) and a remote radio unit (RRU). The BBU and the RRU may be placed in different places. For example, the RRU is remotely deployed and is placed in an open area close to heavy traffic, and the BBU is placed in a central equipment room. Alternatively, the BBU and the RRU may be placed in a same equipment room. Alternatively, the BBU and the RRU may be different components in a same rack.

It should be noted that the wireless communications system mentioned in the embodiments of the present invention includes but is not limited to a Narrowband Internet of Things (NB-IoT) system, a Global System for Mobile Communications (GSM), an Enhanced Data rates for GSM Evolution (EDGE) system, a Wideband Code Division Multiple Access (WCDMA) system, a Code Division Multiple Access 2000 (CDMA2000) system, a Time Division-Synchronous Code Division Multiple Access (TD-SCDMA) system, a Long Term Evolution (LTE) system, an NR system, and a future mobile communications system.

In the embodiments of the present invention, the base station is an apparatus that is deployed in a radio access network and that is configured to provide a wireless communication function for the user equipment. The base station may include various forms of macro base stations, micro base stations (also referred to as small cells), relay nodes, access points, transmission reception points (TRP), and the like. A device with a base station function may have different names in systems that use different radio access technologies. For example, the device is referred to as an evolved NodeB (eNB or eNodeB) in an LTE system, and is referred to as a NodeB (NB) in a 3rd generation (3G) system. For ease of description, in all the embodiments of the present invention, the foregoing apparatuses that provide a wireless communication function for the user equipment are collectively referred to as a network device.

The user equipment in the embodiments of the present invention may include various handheld devices, in-vehicle devices, wearable devices, or computing devices with a wireless communication function, or other processing devices connected to a wireless modem. The user equipment may also be referred to as a mobile station (MS) or a terminal, and may include a subscriber unit, a cellular phone, a smartphone, a wireless data card, a personal digital assistant (PDA) computer, a tablet computer, a wireless modem, a handset, a laptop computer, a machine type communication (MTC) terminal, and the like. For ease of description, in all the embodiments of the present invention, the devices mentioned above are collectively referred to as user equipment.

The following briefly describes downlink beam management phases in existing NR. Uplink beam management phases in the existing NR are not described in the embodiment of the present invention.

Downlink beam management in the existing NR is usually divided into three phases: P-1, P-2, and P-3.

In the P-1 phase, the UE may select one or more transmitting beams through measurement, to form one or more beam pairs (beam pair) with one or more receiving beams. Each beam pair includes one transmitting beam and one receiving beam. Transmitting beams may be from one or more TRPs, and receiving beams are from the target UE.

In the P-2 phase, the UE may update a transmitting beam in the one or more beam pairs based on a measurement result. Transmitting beams may be still from one or more TRPs, but a candidate range of the transmitting beams in the P-2 phase is usually less than that in the P-1 phase.

In the P-3 phase, the UE may update a receiving beam in the one or more beam pairs based on a measurement result. Receiving beams are still from the target UE.

In addition, P-2 and P-3 may be considered as subsets of P-1 in terms of a procedure.

Figure 1:
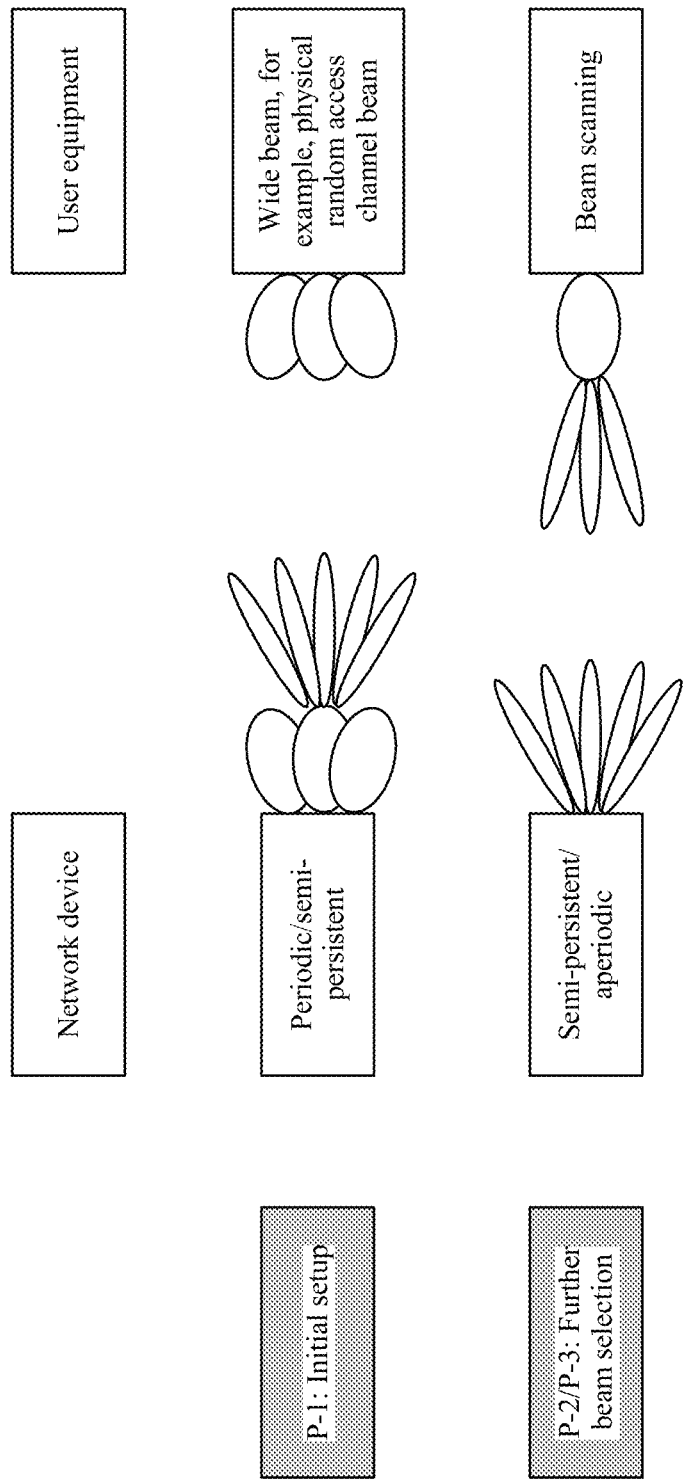
FIG. 1 is a schematic diagram of downlink beam management phases in existing NR.

With reference to FIG. 1, the P-1 phase is a phase in which a system sets up an initial BPL, that is, sets up a BPL between a transmitting beam of a TRP and a receiving beam of the UE. In this phase, beam scanning of the transmitting beam of the TRP may be periodic, or may be semi-persistent. The P-2 phase and the P-3 phase are phases of respectively further selecting a transmitting beam of the TRP and a receiving beam of the UE. In these two phases, beam scanning of the transmitting beam of the TRP may be semi-persistent, or may be aperiodic. It should be noted that "nonperiodic" mentioned in the embodiments of the present invention is "semi-persistent" or "aperiodic".

In the three phases, beam scanning of the transmitting beam of the TRP may be nonperiodic, and consequently CSI-RS resource configuration performed by the base station is blind to a specific extent. A current possible solution has a disadvantage of causing extra signaling and reporting overheads or wasting radio resources. In view of this, the embodiments of the present invention provide a resource configuration method and an apparatus, to pertinently configure a beam management reference signal resource, and specifically, to pertinently configure a CSI-RS resource. This can reduce signaling and reporting overheads or save radio resources.

A quantity of available receiving beams in the embodiments of the present invention is merely used as a descriptive term to describe a value that is selected by a receive side from one or more values allowed by a protocol, for reporting. The value may be autonomously selected by the receiving side, and a specific selection criterion or condition is not limited in the embodiments of the present invention. The quantity of available receiving beams may be understood as a quantity, determined by UE, of receiving beams that need to perform scanning in a polling manner in a specific phase. For example, a maximum capability of the UE can support polling-based scanning of eight receiving beams. In a specific phase, there may be eight available receiving beams. However, in a next phase, the UE may determine, based on some prior information, that only four receiving beams need to perform scanning in a polling manner. In this case, there are four available receiving beams. In the two different phases, the UE reports the two different quantities of available receiving beams. Therefore, the quantity of available receiving beams may be or may not be equivalent to a maximum capability of the UE in a specific phase, and is a value that may be determined and adjusted by the UE based on different phases, different requirements, and different-prior information. The quantity of available receiving beams in the embodiments of the present invention is not a unique term expression form, and in a future standard, may be described in another term expression form, for example, a quantity of beam scanning resource repetition times or a beam scanning auxiliary coefficient. From a technical level, content described by this term may be understood as follows: In a scenario in which a receiving beam of UE participates in beam scanning, a value is reported, so that a base station accurately configures a beam scanning resource, or configures a beam scanning result reporting period. For example, for a semi-persistent scanning type, the base station may configure scanning duration based on the value reported by the UE. For another example, for an aperiodic scanning type, the base station may configure a quantity of scanning triggering times based on the value reported by the UE. For another example, the base station may calculate and configure a corresponding CSI-RS resource based on the value reported by the UE and with reference to a quantity of to-be-scanned transmitting beams of the base station. The base station may configure a quantity of CSI-RS resources based on the value (namely, the quantity of available receiving beams) reported by the UE, and specifically configure a quantity of CSI-RS resources in a corresponding CSI-RS resource set (the CSI-RS resource set includes one or more CSI-RS resources). For another example, the base station may configure a quantity of CSI-RS resources based on the value (namely, the quantity of available receiving beams) reported by the UE, and specifically configure a quantity of measurement repetition times for a corresponding CSI-RS resource set.

The quantity of available receiving beams is associated with the quantity of CSI-RS resources. In an implementation, the quantity of CSI-RS resources is greater than or equal to the quantity of available receiving beams. The quantity of measurement repetition times for the CSI-RS resource set is greater than or equal to the quantity of available receiving beams.

For another example, the base station may calculate and configure a corresponding scanning result reporting period based on the value reported by the UE and with reference to a quantity of to-be-scanned transmitting beams of the base station. It should be understood that a term that meets the foregoing content shall fall within the protection scope of the embodiments of the present invention.

Particularly, in some implementations, an available receiving beam of the UE may be associated with a transmitting beam, and further, the quantity of receiving beams of the UE may be associated with a quantity of transmitting beams. The implementations may include but are not limited to one or more of the following manners:

For example, when beam reciprocity exists between a transmitting beam and a receiving beam of the UE, it may be considered that a quantity of to-be-scanned receiving beams of the UE is equal to a quantity of transmitting beams of the UE.

For example, when a receive radio frequency parameter of the UE is completely consistent with a transmit radio frequency parameter of the UE, it may be considered that a rated quantity of receiving beams of the UE is equal to a rated quantity of transmitting beams of the UE.

For example, during delivery configuration of a UE, a proportional relationship or a difference between a rated quantity of receiving beams of the UE and a rated quantity of transmitting beams of the UE may be set, and the proportional relationship or the difference may be reported by using a UE capability.

For example, during delivery configuration of a UE, a proportional relationship between a half-power beamwidth (HPBW) of a receiving beam of the UE and an HPBW of a transmitting beam of the UE may be set, and the proportional relationship may be reported by using a UE capability.

In one or more of the foregoing implementations, the quantity of receiving beams of the UE may be obtained through calculation based on the quantity of transmitting beams, and the base station may configure a CSI-RS resource or a CSI reporting period based on the quantity of to-be-scanned receiving beams that is obtained through calculation.

The following describes the resource configuration method provided in the embodiments of the present invention with reference to FIG. 3 to FIG. 7.

Figure 3:
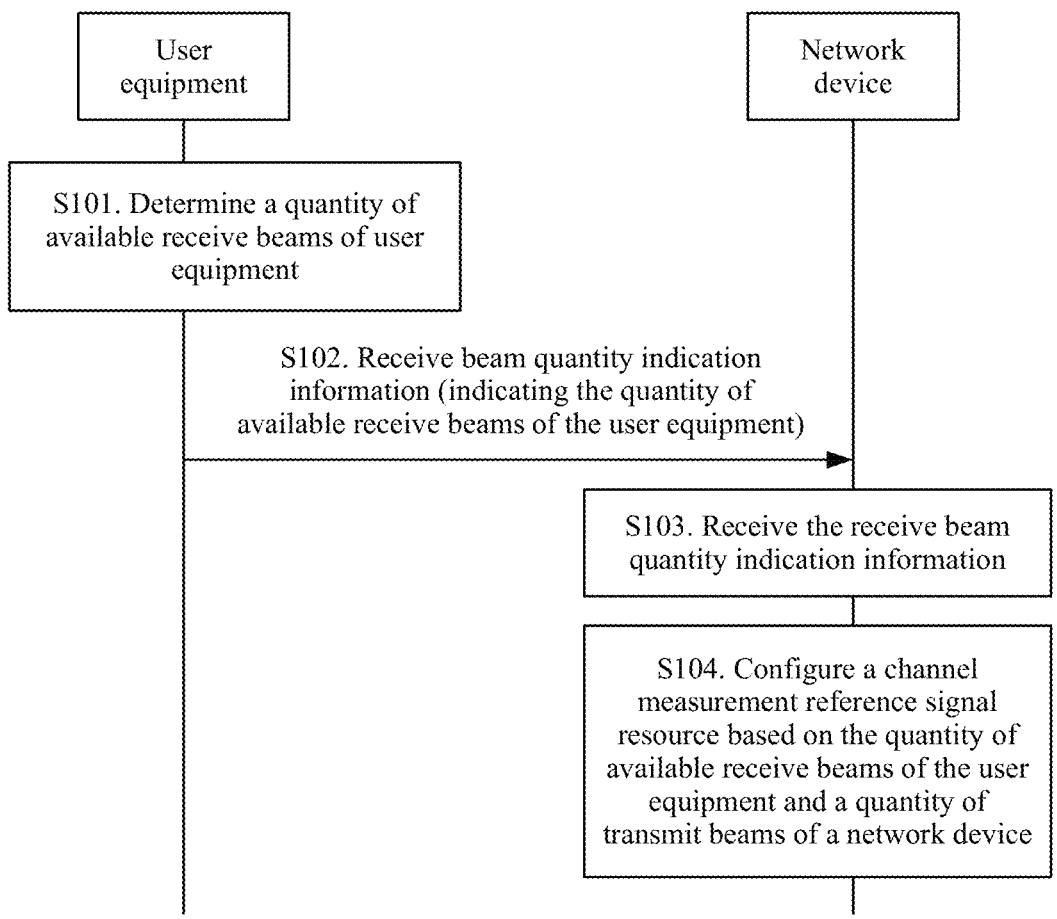
FIG. 3 is a schematic flowchart of a resource configuration method according to an embodiment of the present invention.
Figure 4:
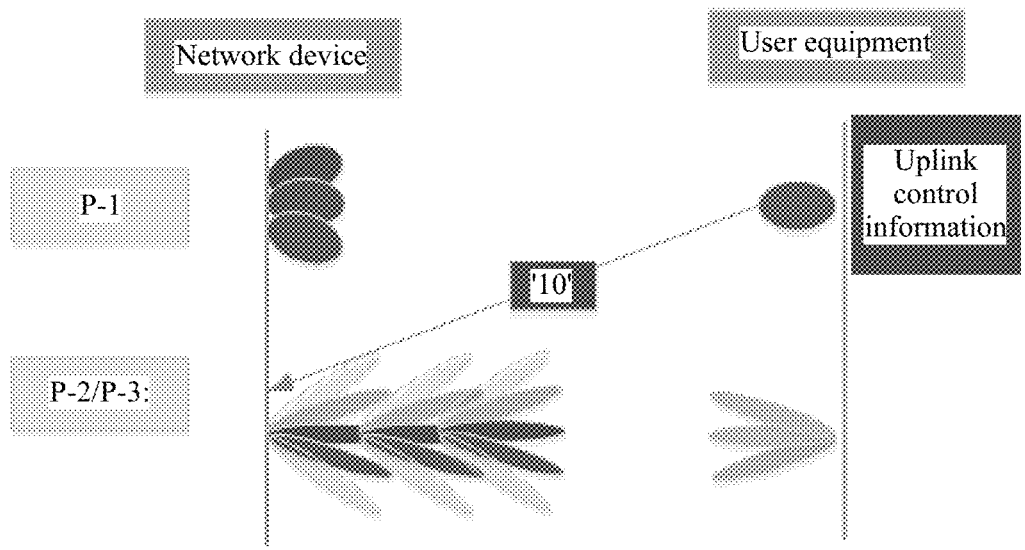
FIG. 4 is an example diagram of reporting receiving beam quantity indication information according to an embodiment of the present invention.
Figure 5:
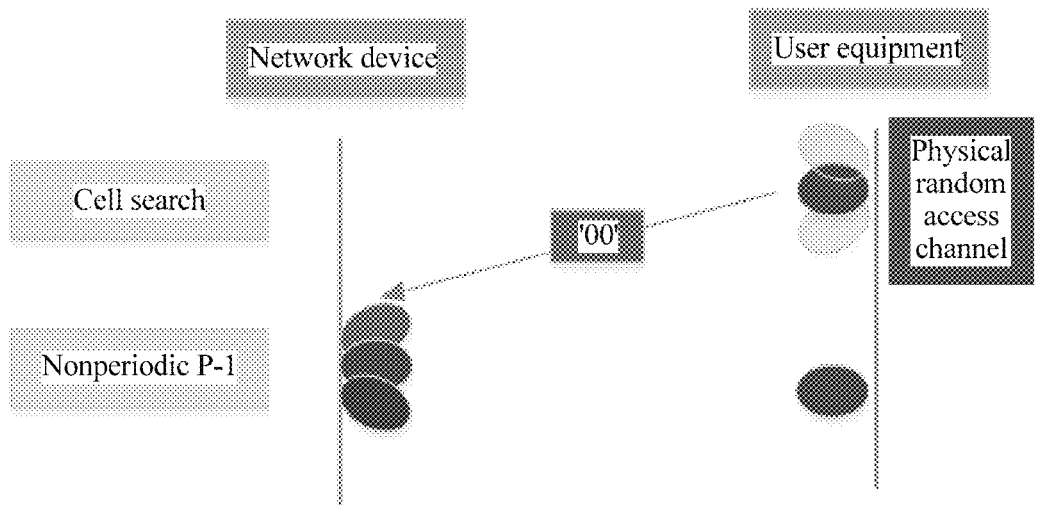
FIG. 5 is another example diagram of reporting receiving beam quantity indication information according to an embodiment of the present invention.

FIG. 3 is a schematic flowchart of a resource configuration method according to an embodiment of the present invention. The embodiment shown in FIG. 3 is described from a perspective of interaction between a network device and user equipment. The method includes but is not limited to the following steps.

Step S101: User equipment determines a quantity of available receiving beams of the user equipment.

Specifically, the quantity of available receiving beams of the UE is constrained by a capability of the UE, and is also affected by an application scenario. The application scenario includes a scenario in which nonperiodic beam scanning or periodic beam scanning occurs after a control information and data communication link has been set up between a base station and the UE (a P-1 phase has been completed), a scenario in which nonperiodic beam scanning or periodic beam scanning occurs before a control information and data communication link is set up between the base station and the UE (the P-1 phase has not been completed), or a scenario in which the UE completes cell search. If the UE has a weak capability, regardless of which application scenario, the UE probably has only one omnidirectional beam for receiving. It is assumed that the UE may emit beams in eight different directions. However, this is merely a reflection of a capability of the UE. In actual application, the UE may narrow, based on prior information obtained in a previous cell search process, a range that the UE searches for an available receiving beam. For example, the eight beams may cover 360°. However, in actual application, the UE has prior information of a receiving beam and a transmitting beam used when accessing a cell, and therefore the UE may search a limited angle range for a receiving beam for subsequent data transmission. For example, if the UE accesses the cell by using a receiving beam 3, the UE may search for a receiving beam at a specific angle from the receiving beam 3, and then determine the quantity of available receiving beams of the UE based on a found receiving beam.

In another possible application scenario, the UE has a plurality of antenna ports, and all or some of the antenna ports can independently perform beamforming. For example, all or some of the antenna ports are respectively corresponding to different radio frequency channels, and these radio frequency channels may be located at different antenna panels. In this application scenario, the antenna ports that can independently perform beamforming may be corresponding to consistent or inconsistent quantities of available receiving beams. Receiving beams corresponding to these different antenna ports may simultaneously or sequentially perform scanning, or may perform scanning in another feasible scanning manner. In this case, the UE may determine a maximum quantity of receiving beams that need to perform scanning in a polling manner of these antenna ports, and use the maximum quantity of receiving beams as the quantity of available receiving beams of the UE. For example, the UE has two antenna ports that can independently perform beamforming, an antenna port 1 is corresponding to four available receiving beams, and an antenna port is corresponding to three available receiving beams. If the receiving beams corresponding to the two antenna ports simultaneously perform scanning, the UE may determine that a maximum quantity of receiving beams that need to perform scanning in a polling manner of the two antenna ports is 4, and use 4 as the quantity of available receiving beams of the UE.

When the user equipment receives a user capability query request message sent by the network device, the user equipment may determine, as the quantity of available receiving beams of the user equipment, a maximum quantity of supportable receiving beams that is indicated by a receiving beam capability of the user equipment. The receiving beam capability indicates the maximum quantity of receiving beams that can be supported by the UE, and different UEs differ in the receiving beam capability. The maximum quantity of receiving beams that can be supported by the user equipment is the quantity of available receiving beams of the user equipment. The user capability query request message may be a UE capability query command used to query capabilities of the UE, including five existing capabilities and the receiving beam capability. The five capabilities include an evolved Universal Terrestrial Radio Access (E-UTRA) capability, a Universal Terrestrial Radio Access (UTRA) capability, a general radio access network circuit switch (GRAN-CS) capability, a general radio access network packet switch (GRAN-PS) capability, and a CDMA2000 1× radio transmission technology (RTT) capability. The user capability query request message is sent by the network device to the user equipment when the user equipment completes cell search.

When the user equipment obtains prior information through cell search, the user equipment may determine the quantity of available receiving beams of the user equipment based on the prior information. A method for determining, by the user equipment, the quantity of available receiving beams of the user equipment based on the prior information is not limited herein. For example, the quantity of available receiving beams of the user equipment may be determined based on a receiving beam at a specific angle from an access beam used to access a cell.

When the user equipment has no prior information, the user equipment may determine a receiving beam used for cell search as an available receiving beam, and then determine the quantity of available receiving beams of the user equipment. In this case, there may be only one available receiving beam.

Step S102: The user equipment sends receiving beam quantity indication information to a network device, where the receiving beam quantity indication information indicates the quantity of available receiving beams of the user equipment.

Specifically, after the quantity of available receiving beams of the user equipment is determined, the receiving beam quantity indication information is sent to the network device. The receiving beam quantity indication information indicates the quantity of available receiving beams of the user equipment. The receiving beam quantity indication information may indicate the quantity of available receiving beams of the user equipment by using N bits, and may indicate 2N specific quantities or $2^N$ quantity intervals. A specific value of N depends on a specific case. It should be particularly noted that a maximum quantity of available receiving beams that the UE is allowed to report is constrained by a protocol, that is, may be constrained by both the specific value of N and a specific indication manner.

For example, the receiving beam quantity indication information indicates a specific quantity of available receiving beams of the user equipment by using two bits. Refer to the following table:

| Signaling | #of Rx Beams |
| --- | --- |
| 00 | 1 (Beam) |
| 01 | 2 (Beams) |
| 10 | 3 (Beams) |
| 11 | 4 (Beams) |

For example, the receiving beam quantity indication information is "10", indicating that the user equipment has three available receiving beams. In this case, the maximum quantity of available receiving beams that the UE is allowed to report is 4.

For example, the receiving beam quantity indication information indicates a quantity interval of the quantity of available receiving beams of the user equipment by using two bits. Refer to the following table:

| Signaling | #of Rx Beams |
| --- | --- |
| 00 | 1 (Beam) |
| 01 | 2 (Beams) |
| 10 | 4 (Beams) |
| 11 | 8 (Beams) |

For example, the receiving beam quantity indication information is "10", indicating that the quantity interval of the quantity of available receiving beams of the user equipment is [3, 4]. In other words, there are three or four available receiving beams. For another example, the receiving beam quantity indication information is "11", indicating a quantity interval [5, 8]. In other words, there are five, six, seven, or eight available receiving beams. In this case, the maximum quantity of available receiving beams that the UE is allowed to report is 8.

In a possible implementation, the user equipment sends the receiving beam quantity indication information to the network device by using uplink control information (UCI). In other words, the receiving beam quantity indication information is carried in the UCI. Optionally, the UCI further includes other information such as a channel quality indicator (CQI), a rank indication (RI), and a precoding matrix indicator (PMI), etc.

It may be considered that in this possible implementation, a system has set up an initial beam-based control information and data communication link, and the user equipment sends the UCI to the network device. Referring to an example diagram, shown in FIG. 4, of reporting receiving beam quantity indication information, UE sends UCI to an NB, and receiving beam quantity indication information carried in the UCI is "10". If the receiving beam quantity indication information indicates a specific quantity, it indicates that the UE has three available receiving beams. If the receiving beam quantity indication information indicates a quantity interval, it indicates that the UE has three or four available receiving beams. Optionally, the network device triggers, in a nonperiodic trigger manner, the user equipment to send the UCI to the network device. In the nonperiodic trigger manner, downlink control information (DCI) may be used to trigger the user equipment to send the UCI to the network device. The UCI may carry a beam-related reporting, and the beam-related report may carry the receiving beam quantity indication information. Alternatively, the receiving beam quantity indication information may be carried in the UCI independently of the beam-related report. For example, the receiving beam quantity indication information may be indicated by using M bits in a predefined UCI format, or may be indicated in another form. A UCI transmission channel may be a physical uplink shared channel (PUSCH), or a physical uplink control channel (PUCCH), or another uplink channel that has a same function and that is defined in a future communications system.

In a possible implementation, the user equipment sends the receiving beam quantity indication information to the network device by using a physical random access channel (PRACH) message. In other words, the receiving beam quantity indication information is carried in the PRACH message. The PRACH message may be a radio resource control (RRC) connection request message, namely, a message 3 in a random access process; or may be a random access preamble message that has an information load (payload) capability, namely, a message 1 in a random access process. Different from a message 1 in an LTE system, the message 1 herein has the information load capability and therefore can carry information. It may be understood that if the message 1 has no information load capability, the receiving beam quantity indication information may be carried in the message 3. If the message 1 has the information load capability, the receiving beam quantity indication information may be carried in the message 1.

It may be considered that in this possible implementation, a system has not set up an initial beam-based control information and data communication link, and the user equipment cannot send the receiving beam quantity indication information to the network device by using the UCI. The user equipment sends the receiving beam quantity indication information to the network device in a cell search (cell acquisition) process by using the PRACH message. Referring to an example diagram, shown in FIG. 5, of reporting receiving beam quantity indication information, UE sends a PRACH message to an NB in a cell search (cell acquisition) process, and receiving beam quantity indication information carried in the PRACH message is "00", indicating that the UE has one available receiving beam.

In a possible implementation, when receiving the user capability query request message sent by the network device, the user equipment may determine, as the quantity of available receiving beams of the user equipment, the maximum quantity of supportable receiving beams that is indicated by the receiving beam capability of the user equipment, and send the receiving beam quantity indication information to the network device by using a user capability query response message. In other words, the receiving beam quantity indication information is carried in the user capability query response message. Optionally, the user capability query response message further includes the five existing capabilities.

Step S103: The network device receives the receiving beam quantity indication information sent by the user equipment.

Specifically, the network device receives the receiving beam quantity indication information based on a carrier of the receiving beam quantity indication information.

In a possible implementation, when the system has set up the initial beam-based control information and data communication link, the receiving beam quantity indication information is received by using the UCI sent by the user equipment.

In a possible implementation, when the system has not set up the initial beam-based control information and data communication link, the receiving beam quantity indication information is received by using the message 1 or the message 3 that is sent by the user equipment.

In a possible implementation, when the user capability query request message is sent, the receiving beam quantity indication information is received by using the user capability query response message sent by the user equipment.

Step S104: The network device configures a beam management reference signal resource based on the quantity of available receiving beams of the user equipment and a quantity of transmitting beams of the network device.

Specifically, the network device may perform configuration based on the quantity of available receiving beams of the user equipment and the quantity of transmitting beams of the network device. In a possible implementation, the network device may configure the beam management reference signal resource based on the quantity of available receiving beams of the user equipment and the quantity of transmitting beams of the network device. In a possible implementation, the network device may configure a beam measurement reporting parameter based on the quantity of available receiving beams of the user equipment and the quantity of transmitting beams of the network device. Alternatively, the network device may perform beam-scanning-related configuration other than the foregoing two configurations based on the quantity of available receiving beams of the user equipment and the quantity of transmitting beams of the network device.

The following describes the foregoing two configurations. First, the case in which the network device may configure the beam management reference signal resource based on the quantity of available receiving beams of the user equipment and the quantity of transmitting beams of the network device is described. The configuration in this case may be applied to resource configuration in a nonperiodic beam scanning scenario.

The beam management reference signal is used by the user equipment to measure beam quality, and may be a CSI-RS, or may be another reference signal used by the UE to measure beam quality.

In an example in which the beam management reference signal is the CSI-RS, the network device determines a quantity of required CSI-RS resources based on the quantity of available receiving beams of the user equipment and the quantity of transmitting beams of the network device, and configures a CSI-RS resource based on the quantity of CSI-RS resources. The quantity of transmitting beams of the network device may be a quantity of available transmitting beams for the user equipment. It is assumed that the user equipment has two available receiving beams, and the network device has four transmitting beams. When multiplexing is not considered, eight CSI-RS resources are required, and the network device configures time-frequency locations, ports, and the like for the eight CSI-RS resources. When multiplexing is considered, the network device determines the quantity of required CSI-RS resources based on a multiplexing manner, and configures a multiplexing manner, time-frequency locations, ports, and the like for these CSI-RS resources. In a process in which the network device configures the CSI-RS resource, in addition to performing configuration based on the quantity of available receiving beams of the user equipment and the quantity of transmitting beams of the network device, the network device may perform configuration based on the quantity of available receiving beams of the user equipment, the quantity of transmitting beams of the network device, and another parameter.

Optionally, the network device may perform configuration for one or more times. For example, in FIG. 4, the receiving beam quantity indication information is "10", indicating that there are three available receiving beams. In this case, the network device continuously triggers transmitting beam scanning for three times, and correspondingly performs configuration for three times. Alternatively, the network device may trigger transmitting beam scanning once, and correspondingly perform configuration once. For another example, in FIG. 5, the receiving beam quantity indication information is "00", indicating that there is one available receiving beam. In this case, the network device triggers transmitting beam scanning only once, and correspondingly performs configuration once.

Optionally, in an example in which the beam management reference signal is the CSI-RS, after completing the configuration, the network device sends CSI-RS resource configuration information to the user equipment, so that the user equipment obtains the CSI-RS based on the configuration information, to measure beam quality.

In an optional embodiment, the network device may preset a threshold of the quantity of available receiving beams of the UE, and a specific value is not limited. For example, the threshold of the quantity of available receiving beams is 8. If the quantity of available receiving beams that is indicated by the receiving beam quantity indication information is less than the threshold of the quantity of available receiving beams, the network device may configure the beam management reference signal resource based on the indicated quantity of available receiving beams and the quantity of transmitting beams of the network device. For example, if the indicated quantity of available receiving beams is 4, and the threshold of the quantity of available receiving beams is 8, the network device configures the CSI-RS resource based on four available receiving beams and the quantity of transmitting beams of the network device. If the quantity of available receiving beams that is indicated by the receiving beam quantity indication information is greater than or equal to the threshold of the quantity of available receiving beams, the network device may configure the beam management reference signal resource based on the threshold of the quantity of available receiving beams and the quantity of transmitting beams of the network device. For example, if the indicated quantity of available receiving beams is 32, and the threshold of the quantity of available receiving beams is 8, the network device may configure the CSI-RS resource based on eight available receiving beams and the quantity of transmitting beams of the network device. Alternatively, the network device may configure the beam management reference signal resource based on the quantity of transmitting beams of the network device and a quantity of available receiving beams that is less than the threshold of the quantity of available receiving beams. A specific value of the quantity of available receiving beams that is less than the threshold of the quantity of available receiving beams is selected by the network device. For example, if the indicated quantity of available receiving beams is 32, and the threshold of the quantity of available receiving beams is 8, the network device may configure the CSI-RS resource based on four available receiving beams and the quantity of transmitting beams of the network device.

It should be noted that in the foregoing optional embodiment, a maximum value of the quantity of available receiving beams that is indicated by the receiving beam quantity indication information is constrained by a protocol, and the base station may set a threshold to further limit the quantity of receiving beams. Base stations may set a same threshold or different thresholds. This is not limited herein.

Then, the case in which the network device may configure the beam measurement reporting parameter based on the quantity of available receiving beams of the user equipment and the quantity of transmitting beams of the network device is described. The configuration in this case may be applied to reporting configuration in a periodic beam scanning scenario.

Currently, from a perspective of beam measurement reporting, the base station configures various beam measurement reporting parameters by using higher layer signaling. In the periodic beam scanning scenario, when the base station does not know the quantity of receiving beams of the UE, the base station may perform the following configuration by default: The UE reports a beam measurement result after scanning all transmitting beams at each receiving beam. This may cause excessive uplink resource occupation. In view of this, in this embodiment of the present invention, the base station configures the beam measurement reporting parameter based on the quantity of receiving beams and the quantity of transmitting beams, so that excessive uplink resource occupation can be avoided.

The beam measurement reporting parameter may be a measurement reporting parameter that is based on a CSI-RS, or may be a measurement reporting parameter that is based on another measurement reference signal. The beam measurement reporting parameter may include a reporting period, a beam measurement result type (a CSI-RS resource indication (CRI), reference signal received power (RSRP), or the like), and the like.

In the periodic beam scanning scenario, the network device configures a CSI-RS resource based on the quantity of transmitting beams of the network device, and performs repeated scanning based on a predetermined period. In this case, the network device may configure a reporting period based on the quantity of transmitting beams of the network device and the quantity of available receiving beams of the UE. Optionally, the reporting period may be configured as follows: The UE performs reporting after completing complete polling-based scanning. For example, if the base station has four transmitting beams, and the UE has two available receiving beams, when configuring the reporting period, the base station instructs the UE to report a beam measurement result once only after the UE completes scanning and pairing on all the transmitting beams and the receiving beams, for example, after the UE completes scanning and pairing for eight times. This can avoid unnecessary reporting, and can properly use an uplink resource. Optionally, the reporting period may be configured as follows: The UE performs reporting once in each predetermined period. For example, if the base station has four transmitting beams, and the UE has two receiving beams, the UE first reports a beam measurement result after performing scanning and pairing on the four transmitting beams and a receiving beam 1, and then reports a beam measurement result again after performing scanning and pairing on the four transmitting beams and a receiving beam 2.

In an optional embodiment, the network device may preset a threshold of the quantity of available receiving beams of the UE, and a specific value is not limited. For example, the threshold of the quantity of available receiving beams is 8. If the quantity of available receiving beams that is indicated by the receiving beam quantity indication information is less than the threshold of the quantity of available receiving beams, the network device may configure the reporting period based on the indicated quantity of available receiving beams and the quantity of transmitting beams of the network device. If the quantity of available receiving beams that is indicated by the receiving beam quantity indication information is greater than or equal to the threshold of the quantity of available receiving beams, the network device may configure the reporting period based on the threshold of the quantity of available receiving beams and the quantity of transmitting beams of the network device.

It should be noted that in the foregoing optional embodiment, a maximum value of the quantity of available receiving beams that is indicated by the receiving beam quantity indication information is constrained by a protocol, and the base station may set a threshold to further limit the quantity of receiving beams. Base stations may set a same threshold or different thresholds. This is not limited herein.

In the embodiment shown in FIG. 3, the user equipment reports the quantity of available receiving beams to the network device, so that the network device configures the beam management reference signal resource based on the quantity of available receiving beams and the quantity of transmitting beams, and specifically, may configure the CSI-RS resource. Because the network device can accurately know the quantity of receiving beams, the network device can trigger reporting of beam-related information once only after complete beam scanning and pairing, so that signaling and reporting overheads are reduced, or radio resources can be saved in comparison with a case of performing configuration based on a maximum quantity of receiving beams that is stipulated by a protocol.

Figure 6:
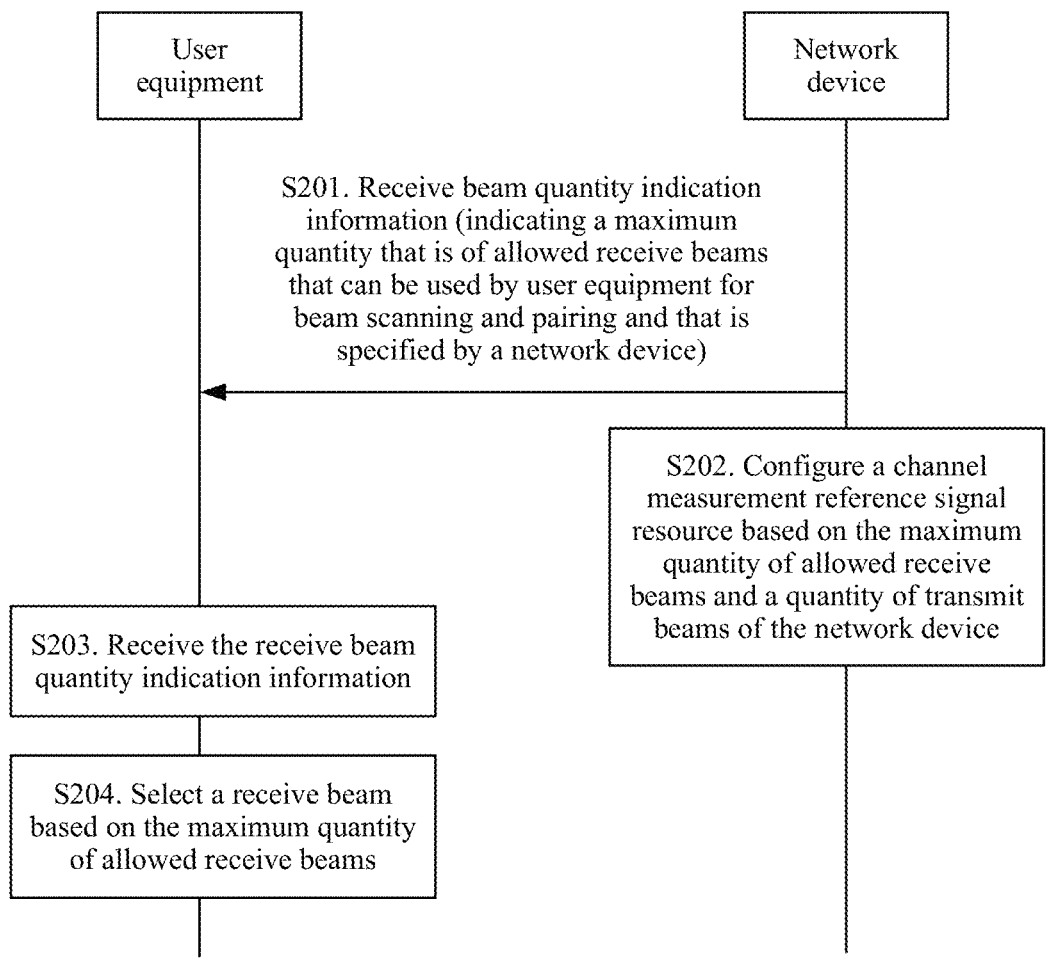
FIG. 6 is a schematic flowchart of another resource configuration method according to an embodiment of the present invention.
Figure 7:
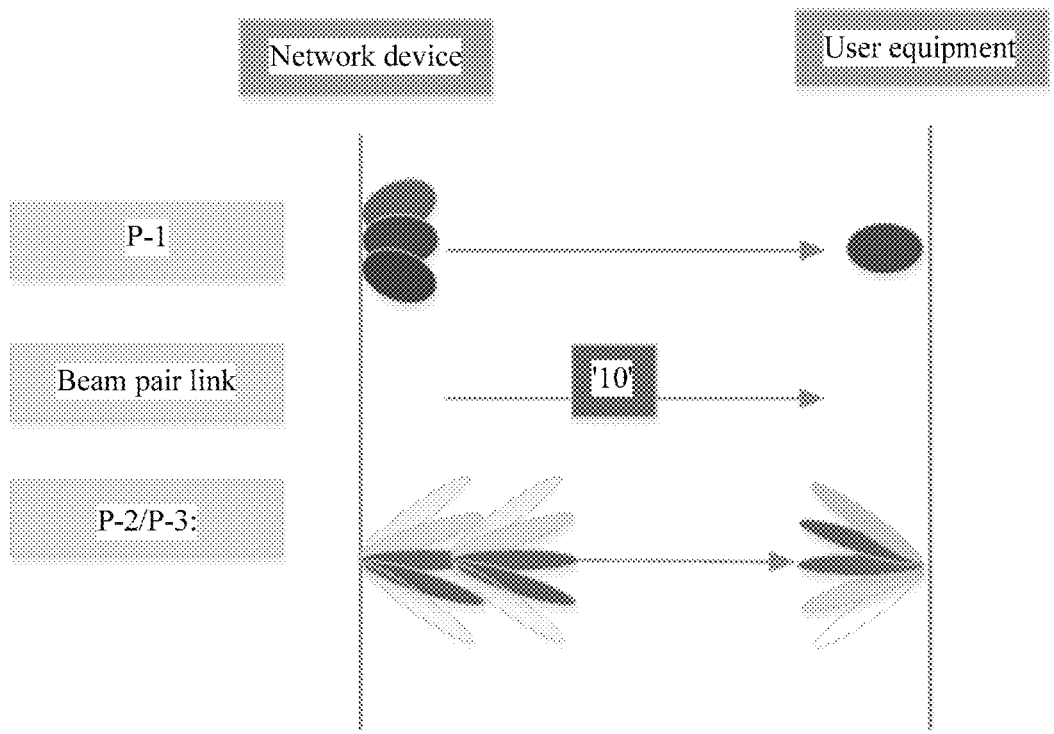
FIG. 7 is an example diagram of delivering receiving beam quantity indication information according to an embodiment of the present invention.

FIG. 6 is a schematic flowchart of another resource configuration method according to an embodiment of the present invention. The embodiment shown in FIG. 6 is described from a perspective of interaction between a network device and user equipment. The method includes but is not limited to the following steps.

Step S201: A network device sends receiving beam quantity indication information to user equipment, where the receiving beam quantity indication information indicates a maximum quantity, specified by the network device, of allowed receiving beams that can be used by the user equipment for beam scanning and pairing.

Specifically, when the network device triggers beam scanning for UE, data communication scheduling of another UE is affected. Therefore, the network device may specify, based on information such as a current service and scenario, a maximum quantity of allowed receiving beams that can be used by specific UE for beam scanning and pairing. Alternatively, the network device may specify, by using another method, the maximum quantity of allowed receiving beams that can be used by the user equipment for beam scanning and pairing.

The network device sends the receiving beam quantity indication information to the user equipment, where the receiving beam quantity indication information indicates the maximum quantity of allowed receiving beams, so that the user equipment selects a receiving beam based on the maximum quantity of allowed receiving beams. The receiving beam quantity indication information may indicate the maximum quantity of allowed receiving beams by using N bits, and may indicate 2N specific quantities or 2N quantity intervals. A specific value of N depends on a specific case.

For example, the receiving beam quantity indication information indicates a specific quantity of the maximum quantity of allowed receiving beams by using two bits. Refer to the following table:

| Signaling | #of Rx Beams |
|---|---|
| 00 | 1 (Beam) |
| 01 | 2 (Beams) |
| 10 | 3 (Beams) |
| 11 | 4 (Beams) |

For example, the receiving beam quantity indication information is "10", indicating that the maximum quantity, specified by the network device, of allowed receiving beams that can be used by the user equipment for beam scanning and pairing is 3.

For example, the receiving beam quantity indication information indicates a quantity interval of the maximum quantity of allowed receiving beams by using two bits. Refer to the following table:

| Signaling | #of Rx Beams |
|---|---|
| 00 | 1 (Beam) |
| 01 | 2 (Beams) |
| 10 | 4 (Beams) |
| 11 | 8 (Beams) |

For example, the receiving beam quantity indication information is "10", indicating that the maximum quantity, specified by the network device, of allowed receiving beams that can be used by the user equipment for beam scanning and pairing is [3,4]. For another example, the receiving beam quantity indication information is "11", indicating a quantity interval [5, 8]. A minimum value is 5 and a maximum value is 8. In this case, the minimum value may be ignored, and attention is paid only to the maximum value.

After an initial beam-based control information and data communication link is set up, the network device sends the receiving beam quantity indication information to the user equipment. Referring to an example diagram, shown in FIG. 7, of delivering receiving beam quantity indication information, an NB sends receiving beam quantity indication information "10" to UE. If the receiving beam quantity indication information indicates a specific quantity, the UE is notified that the network device specifies that the UE is allowed to use a maximum of only three receiving beams for beam scanning and pairing. If the receiving beam quantity indication information indicates a quantity interval, the UE is notified that the network device specifies that the UE is allowed to use a maximum of only four receiving beams for beam scanning and pairing.

In a possible implementation, the network device sends the receiving beam quantity indication information to the user equipment by using RRC signaling. In other words, the receiving beam quantity indication information is carried in the RRC signaling. The RRC signaling belongs to layer 3 signaling, and the layer 3 signaling is usually some control messages. An L3 signaling sending period or control period is usually relatively long, and the L3 signaling is applicable to sending some information that does not frequently change. For example, in some existing communications standards, the L3 signaling is usually used to carry some configuration information. The receiving beam quantity indication information may alternatively be sent by using layer 3 signaling other than the RRC signaling.

In a possible implementation, the network device sends the receiving beam quantity indication information to the user equipment by using Media Access Control (MAC) signaling. In other words, the receiving beam quantity indication information is carried in the MAC signaling. The MAC signaling belongs to layer 2 signaling, and the layer 2 signaling may be usually carried in, for example but not limited to, a frame header of a layer 2 frame. The frame header may further carry, for example but not limited to, information such as a source address and a destination address. In addition to the frame header, the layer 2 frame usually further includes a frame body. In some cases, the L2 signaling may alternatively be carried in the frame body of the layer 2 frame. A typical example of the layer 2 signaling is signaling carried in a frame control field in a frame header of a MAC frame in the family of 802.11 standards, or a MAC control entity (CE) defined in some protocols. The layer 2 frame may be usually carried in a data part of a physical layer frame. The MAC signaling may be a Media Access Control-control element (MAC-CE). The receiving beam quantity indication information may alternatively be sent by using layer 2 signaling other than the MAC signaling.

In a possible implementation, the network device sends the receiving beam quantity indication information to the user equipment by using downlink control information. In other words, the receiving beam quantity indication information is carried in the downlink control information. The downlink control information may be referred to as physical layer signaling and also referred to as layer 1 (Layer 1, L1) signaling, and the layer 1 signaling may be usually carried in a control part of a physical layer frame. The receiving beam quantity indication information may alternatively be sent by using layer 1 signaling other than the downlink control information.

Step S202: The network device configures a beam management reference signal resource based on the maximum quantity of allowed receiving beams and a quantity of transmitting beams of the network device.

An implementation process of step S202 in the embodiment shown in FIG. 6 is similar to that of step S104 in the embodiment shown in FIG. 3, but a difference is that the maximum quantity of allowed receiving beams is used in step S202, and the quantity of available receiving beams is used in step S104.

It should be noted that an execution sequence of step S201 and step S202 is not limited to performing step S201 before step S202. Step S201 and step S202 may be simultaneously performed. To be specific, the receiving beam quantity indication information is sent to the user equipment at the same time when resource configuration is performed. Alternatively, step S202 may be performed before step S201.

Step S203: The user equipment receives the receiving beam quantity indication information sent by the network device.

Specifically, the user equipment receives the receiving beam quantity indication information by using a carrier of the receiving beam quantity indication information.

In a possible implementation, the user equipment receives the receiving beam quantity indication information by using the RRC signaling or other layer 3 signaling.

In a possible implementation, the user equipment receives the receiving beam quantity indication information by using the MAC signaling or other layer 2 signaling.

In a possible implementation, the user equipment receives the receiving beam quantity indication information by using the downlink control information or other layer 1 signaling.

Step S204: The user equipment selects a receiving beam based on the maximum quantity of allowed receiving beams.

Specifically, the user equipment obtains a quantity of available receiving beams of the user equipment. If the quantity of available receiving beams of the user equipment is greater than the maximum quantity of allowed receiving beams, the user equipment selects, from the available receiving beams of the user equipment, receiving beams whose quantity is the same as the maximum quantity of allowed receiving beams. For example, if the maximum quantity of allowed receiving beams is 4, and the user equipment has five available receiving beams, the user equipment selects four receiving beams from the five available receiving beams. A specific selection method is not limited herein, provided that four receiving beams are selected. If the quantity of available receiving beams of the user equipment is less than or equal to the maximum quantity of allowed receiving beams, the user equipment selects all the available receiving beams of the user equipment. For example, if the maximum quantity of allowed receiving beams of the user equipment is 4, and the user equipment has three available receiving beams, the user equipment selects all the three available receiving beams.

If the quantity of available receiving beams of the user equipment is less than the maximum quantity of allowed receiving beams, some radio resources may be wasted when the network device configures a resource. For example, if the maximum quantity of allowed receiving beams of the user equipment is 4, the network device configures a resource based on four receiving beams, but the user equipment has three available receiving beams. Consequently, some receiving beam resources may be wasted.

Although the delivered receiving beam quantity indication information may cause a waste of some radio resources when the network device constrains the maximum quantity of allowed receiving beams of the user equipment, reporting of beam-related information can be triggered once only after complete beam scanning and pairing, so that signaling and reporting overheads are reduced, or fewer radio resources are wasted in comparison with a case of performing configuration based on a maximum quantity of receiving beams that is stipulated by a protocol.

After selecting the receiving beam, the user equipment performs beam scanning and pairing based on the selected receiving beam and a transmitting beam of the network device. For example, if the maximum quantity of allowed receiving beams is 4, and the user equipment has five available receiving beams, the user equipment performs beam scanning and pairing on the transmitting beam of the network device and four receiving beams selected from the five available receiving beams. If the maximum quantity of allowed receiving beams of the user equipment is 4, and the user equipment has three available receiving beams, the user equipment performs beam scanning and pairing on the all the selected three receiving beams and the transmitting beam of the network device.

In an example in which the beam management reference signal is a CSI-RS, after completing beam scanning and pairing, the user equipment may receive, based on a beam pair link, CSI-RS resource configuration information sent by the network device, obtain the CSI-RS based on the configuration information, and measure beam quality.

In the embodiment shown in FIG. 6, the network device constrains the maximum quantity of allowed receiving beams that can be used by the user equipment for beam scanning and pairing, so that the network device configures the beam management reference signal resource, and specifically, may configure a CSI-RS resource, based on the maximum quantity of allowed receiving beams and the quantity of transmitting beams. The network device can trigger reporting of beam-related information once only after complete beam scanning and pairing, so that signaling and reporting overheads are reduced, or radio resources can be saved in comparison with a case of performing configuration based on a maximum quantity of receiving beams that is stipulated by a protocol.

It should be noted that in the embodiment shown in FIG. 3, the user equipment notifies the network device of the quantity of available receiving beams, and in the embodiment shown in FIG. 6, the network device constrains the maximum quantity of allowed receiving beams of the user equipment. In both the embodiments, signaling and reporting overheads can be reduced or radio resources can be saved. Which embodiment is specifically implemented depends on a specific case.

In an optional embodiment, a protocol may define a threshold Y. The threshold may be used as a default value of a quantity of available receiving beams of UE during beam scanning, and a specific value of the threshold is not limited. For all base stations and all UEs, the threshold is fixed and can be known. By default, a base station performs scanning-related configuration (for example, CSI-RS resource configuration or reporting period configuration) based on a quantity of transmitting beams of the base station and Y. If a quantity of actually available receiving beams of the UE is greater than or equal to Y, the UE may select a maximum of Y available receiving beams from the actually available receiving beams, for beam scanning. For example, if the UE has four actually available receiving beams, and Y=2, the UE selects a maximum of two available receiving beams from the four actually available receiving beams, for beam scanning. If a quantity of actually available receiving beams of the UE is less than Y, the UE may perform beam scanning based on the quantity of actually available receiving beams of the UE.

Optionally, although the protocol defines the threshold Y, the base station may select a threshold Y' less than Y, and notify the UE of the selected Y', so that when the quantity of actually available receiving beams of the UE is greater than or equal to Y', the UE may select a maximum of Y' available receiving beams from the actually available receiving beams, for beam scanning.

It should be noted that in the foregoing optional embodiment, because the protocol has defined the default value used by the base station to configure a resource or a reporting period, the UE may not feed back the quantity of actually available receiving beams of the UE to the base station.

Figure 8A:
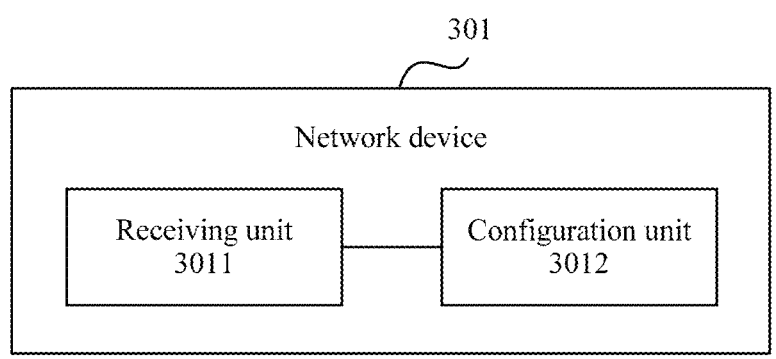
FIG. 8a is a schematic diagram of a logical structure of a network device according to an embodiment of the present invention.

FIG. 8a is a schematic diagram of a logical structure of a network device according to an embodiment of the present invention. The network device 301 shown in FIG. 8a includes a receiving unit 3011 and a configuration unit 3012.

In a possible implementation, the receiving unit 3011 is configured to receive receiving beam quantity indication information sent by user equipment, where the receiving beam quantity indication information indicates a quantity of available receiving beams of the user equipment; and the configuration unit 3012 is configured to configure a beam management reference signal resource based on the quantity of available receiving beams of the user equipment and a quantity of transmitting beams of the network device.

It should be noted that the receiving unit 3011 is configured to implement step S103 in the embodiment shown in FIG. 3, and the configuration unit 3012 is configured to implement step S104 in the embodiment shown in FIG. 3.

In another possible implementation, the receiving unit 3011 is configured to receive receiving beam quantity indication information sent by user equipment, where the receiving beam quantity indication information indicates a quantity of available receiving beams of the user equipment; and the configuration unit 3012 is configured to configure a beam measurement reporting parameter based on the quantity of available receiving beams of the user equipment and a quantity of transmitting beams of the network device.

Figure 8B:
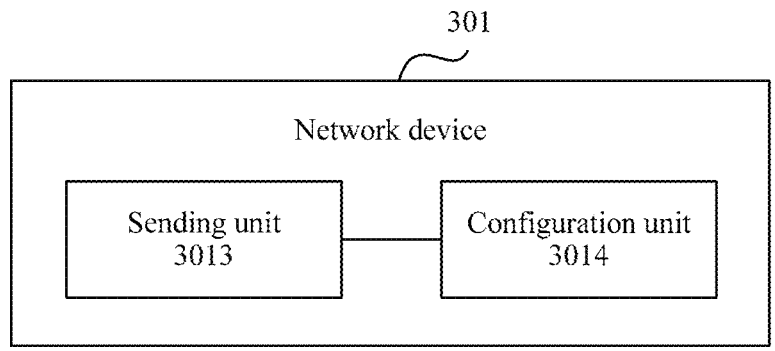
FIG. 8b is a schematic diagram of another logical structure of a network device according to an embodiment of the present invention.

FIG. 8b is a schematic diagram of another logical structure of a network device according to an embodiment of the present invention. The network device 301 shown in FIG. 8b includes a sending unit 3013 and a configuration unit 3014.

The sending unit 3013 is configured to send receiving beam quantity indication information to user equipment, where the receiving beam quantity indication information indicates a maximum quantity, specified by the network device, of allowed receiving beams that can be used by the user equipment for beam scanning and pairing, and the receiving beam quantity indication information is used by the user equipment to select a receiving beam based on the maximum quantity of allowed receiving beams.

The configuration unit 3014 is configured to configure a beam management reference signal resource based on the maximum quantity of allowed receiving beams and a quantity of transmitting beams of the network device.

It should be noted that the sending unit 3013 is configured to implement step S201 in the embodiment shown in FIG. 6, and the configuration unit 3014 is configured to implement step S202 in the embodiment shown in FIG. 6.

Figure 9A:
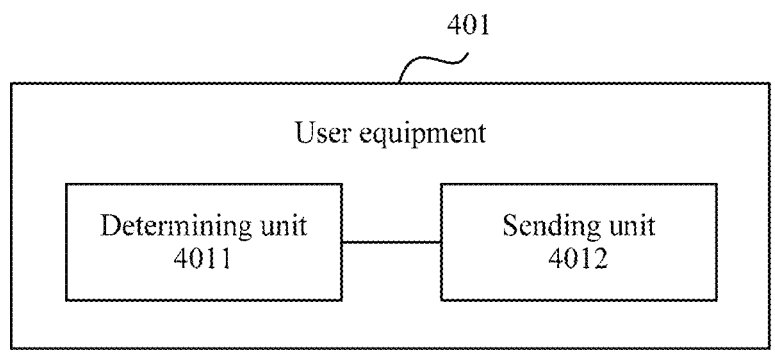
FIG. 9a is a schematic diagram of a logical structure of user equipment according to an embodiment of the present invention.

FIG. 9a is a schematic diagram of a logical structure of user equipment according to an embodiment of the present invention. The user equipment 401 shown in FIG. 9a includes a determining unit 4011 and a sending unit 4012.

The determining unit 4011 is configured to determine a quantity of available receiving beams of the user equipment.

The sending unit 4012 is configured to send receiving beam quantity indication information to a network device, where the receiving beam quantity indication information indicates the quantity of available receiving beams of the user equipment, and the receiving beam quantity indication information is used by the network device to configure a beam management reference signal resource based on the quantity of available receiving beams of the user equipment and a quantity of transmitting beams of the network device.

It should be noted that the determining unit 4011 is configured to implement step S101 in the embodiment shown in FIG. 3, and the sending unit 4012 is configured to implement step S102 in the embodiment shown in FIG. 3.

Figure 9B:
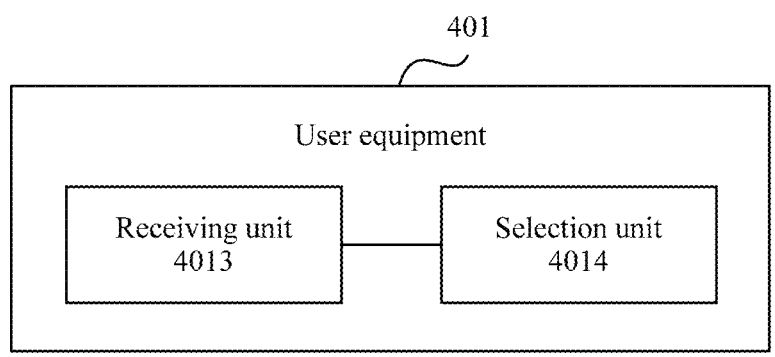
FIG. 9b is a schematic diagram of another logical structure of user equipment according to an embodiment of the present invention.

FIG. 9b is a schematic diagram of another logical structure of user equipment according to an embodiment of the present invention. The user equipment 401 shown in FIG. 9b includes a receiving unit 4013 and a selection unit 4014.

The receiving unit 4013 is configured to receive receiving beam quantity indication information sent by a network device, where the receiving beam quantity indication information indicates a maximum quantity, specified by the network device, of allowed receiving beams that can be used by the user equipment for beam scanning and pairing.

The selection unit 4014 is configured to select a receiving beam based on the maximum quantity of allowed receiving beams.

It should be noted that the receiving unit 4013 is configured to implement step S203 in the embodiment shown in FIG. 6, and the selection unit 4014 is configured to implement step S204 in the embodiment shown in FIG. 6.

The network device shown in FIG. 8a is combined with the user equipment shown in FIG. 9a to implement the embodiment shown in FIG. 3. The network device shown in FIG. 8*b* is combined with the user equipment shown in FIG. 9*b* to implement the embodiment shown in FIG. 6.

Figure 10:
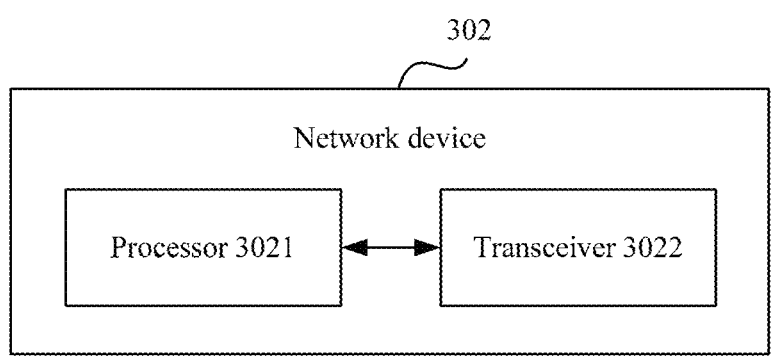
FIG. 10 is a schematic diagram of an entity structure of a network device according to an embodiment of the present invention.

When the receiving unit 3011 and the sending unit 3013 may be a transceiver, and the configuration unit 3012 and the configuration unit 3014 may be a processor, for a schematic diagram of an entity structure of the network device, refer to a network device shown in FIG. 10. The network device 302 shown in FIG. 10 includes a processor 3021 and a transceiver 3022. It should be noted that the schematic diagram of the entity structure shown in FIG. 10 constitutes no limitation on the embodiments of the present invention. In actual application, the network device may further include other components such as a memory.

The processor 3021 may be a controller, a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor 3021 may implement or execute various example logical blocks, modules, and circuits that are described with reference to the content disclosed in the embodiments of the present invention. The processor 3021 may alternatively be a combination that implements a computing function, for example, a combination that includes one or more microprocessors, or a combination of a DSP and a microprocessor.

The transceiver 3022 may be a communications module or a transceiver circuit, and is configured to transmit information such as data or signaling between the network device and the user equipment.

Figure 11:
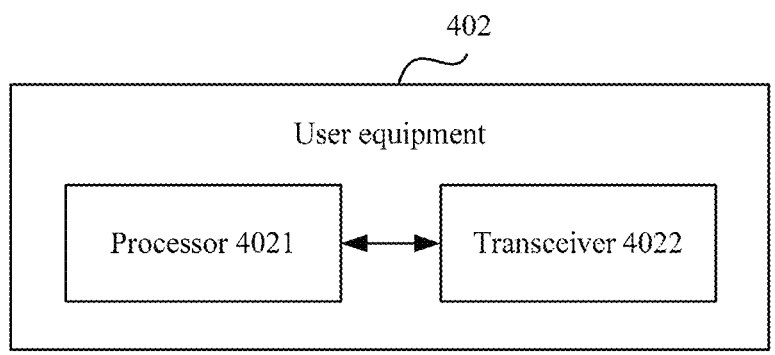
FIG. 11 is a schematic diagram of an entity structure of user equipment according to an embodiment of the present invention.

When the sending unit 4012 and the receiving unit 4013 may be a transceiver, and the determining unit 4011 and the selection unit 4014 may be a processor, for a schematic diagram of an entity structure of the user equipment, refer to user equipment shown in FIG. 11. The user equipment 402 shown in FIG. 11 includes a processor 4021 and a transceiver 4022. It should be noted that the schematic diagram of the entity structure shown in FIG. 11 constitutes no limitation on the embodiments of the present invention. In actual application, the user equipment may further include other components such as a memory and an input device.

The processor 4021 may be a controller, a CPU, a general purpose processor, a DSP, an ASIC, an FPGA or another programmable logic device, a transistor logic device, a hardware component, or any combination thereof. The processor 4021 may implement or execute various example logical blocks, modules, and circuits that are described with reference to the content disclosed in the embodiments of the present invention. The processor 4021 may alternatively be a combination that implements a computing function, for example, a combination that includes one or more microprocessors, or a combination of a DSP and a microprocessor.

The transceiver 4022 may be a communications module or a transceiver circuit, and is configured to transmit information such as data or signaling between the user equipment and the network device, and is further configured to transmit information between the user equipment and another user equipment.

All or some of the foregoing embodiments may be implemented by software, hardware, firmware, or any combination thereof. When the embodiments are implemented by software, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD (Digital Video Disc, digital video disc)), a semiconductor medium (for example, a solid state disk (SSD)), or the like.

What is claimed is:

1. A user equipment (UE), comprising:
   at least one processor, the at least one processor configured to generate receiving beam quantity indication information indicating a quantity interval of a quantity of available receiving beams of the UE, wherein the quantity of available receiving beams is determined based on a maximum quantity of receiving beams that is supported by the UE and a receiving beam at a specific angle from an access beam used to access a cell; and
   a transceiver, the transceiver configured to:
     send the receiving beam quantity indication information, carried in uplink control information (UCI) triggered by a network device, to the network device, wherein the quantity of available receiving beams is used for a configuration of a resource of beam management aperiodic downlink reference signal for the UE; and
     receive the configuration of a resource of beam management aperiodic downlink reference signal for the UE from the network device, wherein the resource of beam management aperiodic downlink reference signal is a resource used by the UE to measure reference signal received power (RSRP) of an aperiodic downlink reference signal to obtain beam-related information;
     receive, from the network device, a trigger of reporting of beam-related information, wherein the trigger instructs the UE to report the beam-related information only one time after complete beam scanning and pairing; and
     report the beam-related information in response to the trigger.

2. The UE according to claim 1, wherein the transceiver is configured to:
   receive a user capability query request from the network device; and
   send a user capability query response to the network device, wherein the receiving beam quantity indication information is carried in the user capability query response.

3. The UE according to claim 1, wherein the resource of beam management aperiodic downlink reference signal comprises a channel state information-reference signal (CSI-RS) resource.

4. The UE according to claim 1, wherein the maximum quantity is 2 or 8.

5. An apparatus, comprising:
at least one processor, the at least one processor coupled to a memory and configured to read an instruction in the memory to:
generate receiving beam quantity indication information indicating a quantity interval of a quantity of available receiving beams of a user equipment (UE), wherein the quantity of available receiving beams is determined based on a maximum quantity of receiving beams that is supported by the UE and a receiving beam at a specific angle from an access beam used to access a cell;
cause a transceiver of the UE to send the receiving beam quantity indication information, carried in uplink control information (UCI) triggered by a network device, to the network device, wherein the quantity of available receiving beams is used for a configuration of a resource of beam management aperiodic downlink reference signal for the UE; and
cause the transceiver of the UE to receive the configuration of a resource of beam management aperiodic downlink reference signal for the UE from the network device, wherein the resource of beam management aperiodic downlink reference signal is a resource used by the UE to measure reference signal received power (RSRP) of an aperiodic downlink reference signal to obtain beam-related information;
cause the transceiver of the UE to receive, from the network device, a trigger of reporting of beam-related information, wherein the trigger instructs the UE to report the beam-related information only one time after complete beam scanning and pairing; and
cause the transceiver of the UE to report the beam-related information in response to the trigger.

6. The apparatus according to claim 5, wherein the at least one processor is configured to:
cause the transceiver of the UE to receive a user capability query request from the network device; and
cause the transceiver of the UE to send a user capability query response to the network device, wherein the receiving beam quantity indication information is carried in the user capability query response.

7. The apparatus according to claim 5, wherein the resource of beam management aperiodic downlink reference signal comprises a channel state information-reference signal (CSI-RS) resource.

8. The apparatus according to claim 5, wherein the maximum quantity is 2 or 8.

9. A method in a wireless communication for reporting user information, comprising:
generating, by a user equipment (UE), receiving beam quantity indication information indicating a quantity interval of a quantity of available receiving beams of the UE, wherein the quantity of available receiving beams is determined based on a maximum quantity of receiving beams that is supported by the UE and a receiving beam at a specific angle from an access beam used to access a cell;
sending, by the UE, the receiving beam quantity indication information, carried in uplink control information (UCI) triggered by a network device, to the network device, wherein the quantity of available receiving beams is used for a configuration of a resource of beam management aperiodic downlink reference signal for the UE; and receiving, by the UE, the configuration of a resource of beam management aperiodic downlink reference signal for the UE from the network device, wherein the resource of beam management aperiodic downlink reference signal is a resource used by the UE to measure reference signal received power (RSRP) of an aperiodic downlink reference signal to obtain beam-related information;
receiving, by the UE from the network device, a trigger of reporting of beam-related information, wherein the trigger instructs the UE to report the beam-related information only one time after complete beam scanning and pairing; and
reporting, by the UE, the beam-related information in response to the trigger.

10. The method according to claim 9, wherein the method further comprises:
receiving, by the UE, a user capability query request from the network device; and
sending, by the UE, a user capability query response to the network device, wherein the receiving beam quantity indication information is carried in the user capability query response.

11. The method according to claim 9, wherein the resource of beam management aperiodic downlink reference signal comprises a channel state information-reference signal (CSI-RS) resource.

12. The method according to claim 9, wherein the maximum quantity is 2 or 8.

13. A non-transitory computer readable storage medium, comprising a computer program stored thereon which, when executed by a computer, causes the computer to:
generate receiving beam quantity indication information indicating a quantity interval of a quantity of available receiving beams of a user equipment (UE), wherein the quantity of available receiving beams is determined based on a maximum quantity of receiving beams that is supported by the UE and a receiving beam at a specific angle from an access beam used to access a cell;
send the receiving beam quantity indication information, carried in uplink control information (UCI) triggered by a network device, to the network device, wherein the quantity of available receiving beams is used for a configuration of a resource of beam management aperiodic downlink reference signal for the UE; and
receive the configuration of a resource of beam management aperiodic downlink reference signal for the UE from the network device, wherein the resource of beam management aperiodic downlink reference signal is a resource used by the UE to measure reference signal received power (RSRP) of an aperiodic downlink reference signal to obtain beam-related information;
receive, from the network device, a trigger of reporting of beam-related information, wherein the trigger instructs the UE to report the beam-related information only one time after complete beam scanning and pairing;
report the beam-related information in response to the trigger.

14. The non-transitory computer readable storage medium according to claim 13, wherein the receiving beam quantity indication information is carried in a user capability query response message.

15. The non-transitory computer readable storage medium according to claim 13, wherein the resource of beam management aperiodic downlink reference signal comprises a channel state information-reference signal (CSI-RS) resource.

16. The non-transitory computer readable storage medium according to claim 13, wherein the maximum quantity is 2 or 8.

* * * * *